United States Patent [19]
Horie et al.

[11] Patent Number: 5,172,674
[45] Date of Patent: Dec. 22, 1992

[54] INTERNAL COMBUSTION ENGINE

[75] Inventors: Kaoru Horie; Kazutoshi Nishizawa; Kenichiro Kinoshita; Makoto Kishida; Hidehito Ikebe; Hitoshi Takahashi, all of Saitama, Japan

[73] Assignee: Honda Giken Kogyo Kabushiki Kaisha, Tokyo, Japan

[21] Appl. No.: 800,613

[22] Filed: Nov. 27, 1991

[30] Foreign Application Priority Data

Nov. 30, 1990 [JP] Japan .................. 2-336585

[51] Int. Cl.⁵ .............. F02M 25/07; F02M 35/10; F02M 23/06
[52] U.S. Cl. .................. 123/571; 123/308; 123/585
[58] Field of Search ............ 123/90.16, 306, 308, 123/531, 568, 571, 585

[56] References Cited

U.S. PATENT DOCUMENTS

| | | | |
|---|---|---|---|
| 4,354,463 | 10/1982 | Otani et al. | 123/568 X |
| 4,361,126 | 11/1982 | Knapp et al. | 123/585 |
| 4,484,549 | 11/1984 | Yokoyama | 123/308 |
| 4,714,063 | 12/1987 | Oda et al. | 123/308 |
| 4,732,116 | 3/1988 | Tanahashi et al. | 123/568 X |
| 4,856,473 | 8/1989 | Kawai et al. | 123/308 |
| 4,875,455 | 10/1989 | Hashimoto et al. | 123/568 |
| 5,024,201 | 6/1991 | Kobayashi et al. | 123/531 |

*Primary Examiner*—Willis R. Wolfe
*Attorney, Agent, or Firm*—Lyon & Lyon

[57] ABSTRACT

An internal combustion engine having an assist air supply device for finely dividing injected fuel and an exhaust gas recirculation device for selectively circulating an exhaust gas from an exhaust passage into an air intake passage. In this internal combustion engine, a swirl operation for a lean burn during a low load on the engine and a non-swirl operation for a burn based on a theoretical air-fuel ratio can be selectively switched between such operations. In the non-swirl operation, the supply of an assist air and the recirculation of a large amount of an exhaust gas are carried out. This makes it possible to reduce both specific consumption of fuel and the amount of $NO_x$ in the exhaust gas over the entire operational region of the engine.

4 Claims, 14 Drawing Sheets

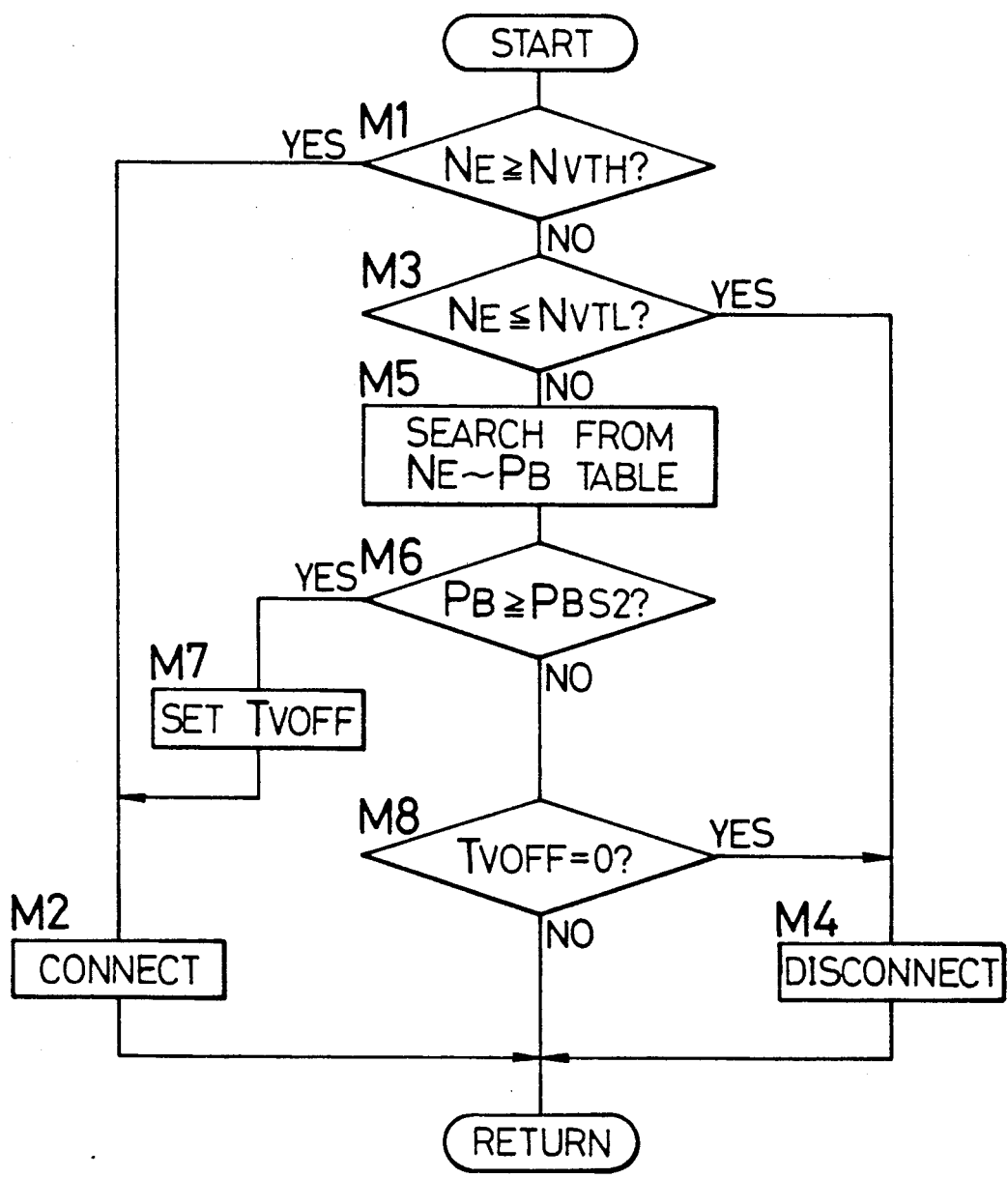

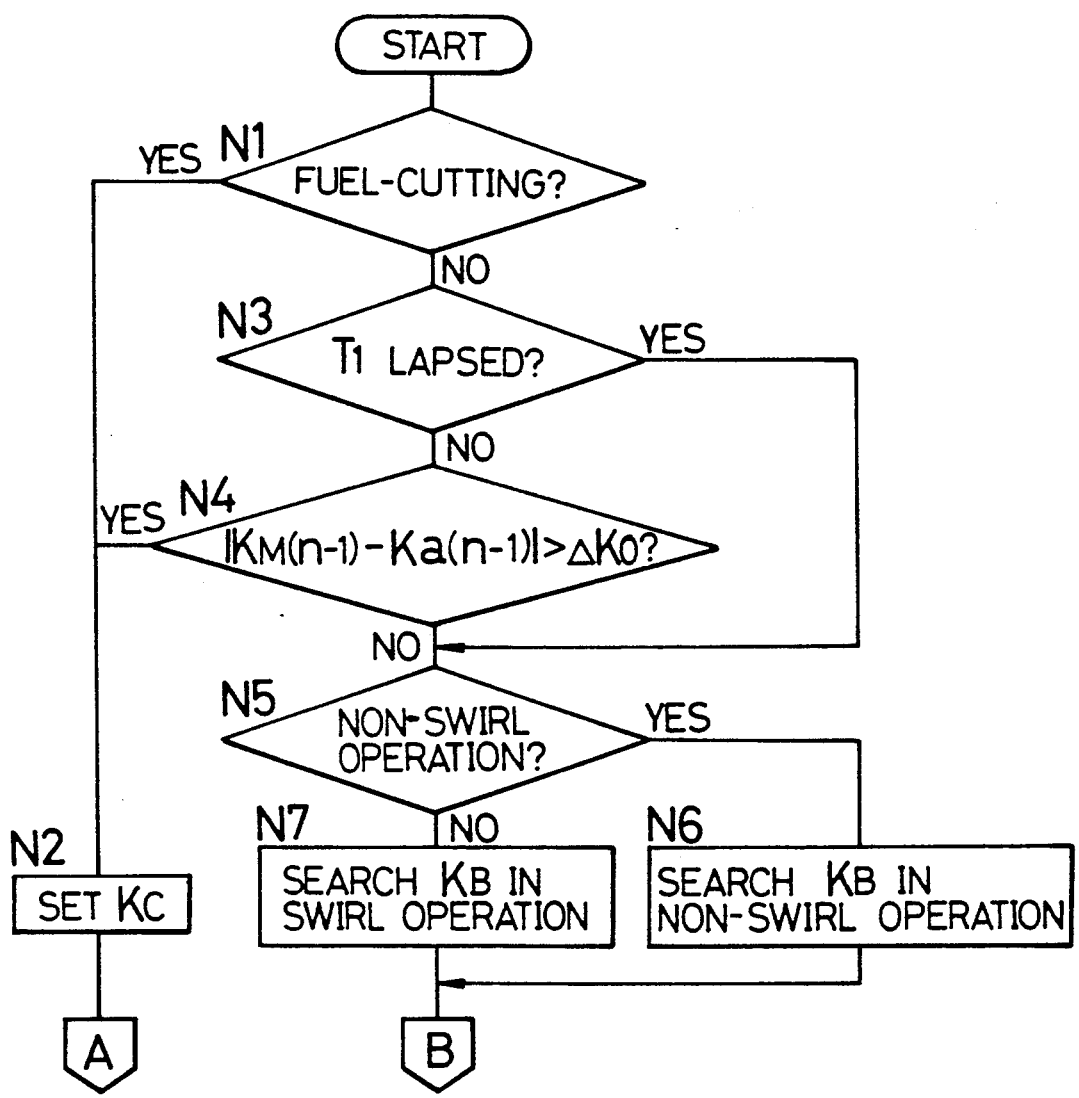

INTERNAL COMBUSTION ENGINE

BACKGROUND OF THE INVENTION

1. Field of the Invention

The field of the present invention is internal combustion engines of the type having a fuel injection valve disposed in the middle of an intake passage with an assist air supply means for finely dividing the fuel, an exhaust gas circulation device for circulating the exhaust gas from the exhaust passage to the intake passage, a swirl control device for producing a swirl in the combustion chamber in accordance with the operational condition of the engine, and a control means for controlling the operations of the assist air supply means, the fuel injection valve, the exhaust gas recirculation device and the swirl control device.

2. Description Of The Prior Art

An internal combustion engine which is capable of being switched between a swirl operation for a lean burn during a low load on the engine and a non-swirl operation for a burn based on a theoretical air-fuel ratio during a high load on the engine is known, for example, from Japanese Laid-open Patent Application No. 142053/85. If the ejected fuel is finely divided by assisting air in such a prior art engine, an improvement in combustibility and a reduction in specific consumption of the fuel can be achieved. Also, it is known to provide an improvement in specific consumption of the fuel and reduce NOx in the exhaust gas by the recirculation of the exhaust gas. In order to further improve the reduction in specific consumption of the fuel, a combination of the air-assisting with the recirculation of the exhaust gas is possible. However, if the recirculation of the exhaust gas is conducted irrespective of the operational condition of the engine, there is a possibility that the combustibility may be reduced. More specifically, if the recirculation of the exhaust gas is conducted during a low load operation in a lean burn condition, a deterioration of the combustibility occurs.

SUMMARY OF THE INVENTION

Accordingly, it is an object of the present invention to provide an internal combustion designed to provide reductions in NOx and specific consumption of the fuel over the entire operational region of the engine. To achieve this object, according to the present invention, there is provided an internal combustion engine having a fuel injection valve disposed in the middle of an intake passage with an assist air supply means for finely dividing the fuel, an exhaust gas circulation device for circulating the exhaust gas from the exhaust passage to the intake passage, a swirl control device for producing a swirl in the combustion chamber in accordance with the operational condition of the engine, and a control means for controlling the operations of the assist air supply means, the fuel injection valve, the exhaust gas recirculation device and the swirl control device, wherein the control means causes a swirl operation for a lean burn during a low load on the engine and a non-swirl operation for a burn based on a theoretical air-fuel ratio during a high load on the engine, and the supply of an assist air and the recirculation of a large amount of the exhaust gas are carried out in the non-swirl operation.

With the above construction of this invention, the amount of constriction of the throttle valve is at a relatively small level in the swirl operation during the low load of the engine, thereby reducing the pumping loss to provide a reduction in NOx by a reduction in combustion temperature. In the non-swirl operation during the high load on the engine, the combustion is stabilized by the assisting air to enable the recirculation of a large amount of the exhaust gas, thus providing a reduction in specific consumption of the fuel and a reduction in NOx over the entire operational region of the engine.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 11 illustrate a preferred embodiment of an internal combustion engine according to the present invention, wherein FIG. 1 is a diagramatic view illustrating the construction of the entire internal combustion engine;

FIG. 2 is an enlarged sectional view illustrating a valve-operating device;

FIG. 3 is a plan view taken along a line III—III in FIG. 2;

FIG. 4 is an enlarged sectional view taken along a line IV—IV in FIG. 3;

FIG. 5 is an enlarged sectional view of the encircled portion indicated by the character V in FIG. 1 illustrating the fuel injector;

FIG. 6 is a flow chart illustrating a processing procedure for prohibiting the supply of an assist air;

FIG. 7 is a diagram illustrating an assist-air supply stopping region and a swirl-producing region;

FIG. 8 is a flow chart illustrating a processing procedure for producing a swirl;

FIGS. 9A and 9B are flow charts illustrating a processing procedure for controlling the amount of fuel injected;

FIG. 11 is a graph illustrating the factor of correction by a theoretical air-fuel ratio correspondence value.

DESCRIPTION OF THE PREFERRED EMBODIMENTS

The present invention will now be described by way of a preferred embodiment of the present invention in connection with the accompanying drawings.

Figure 1:
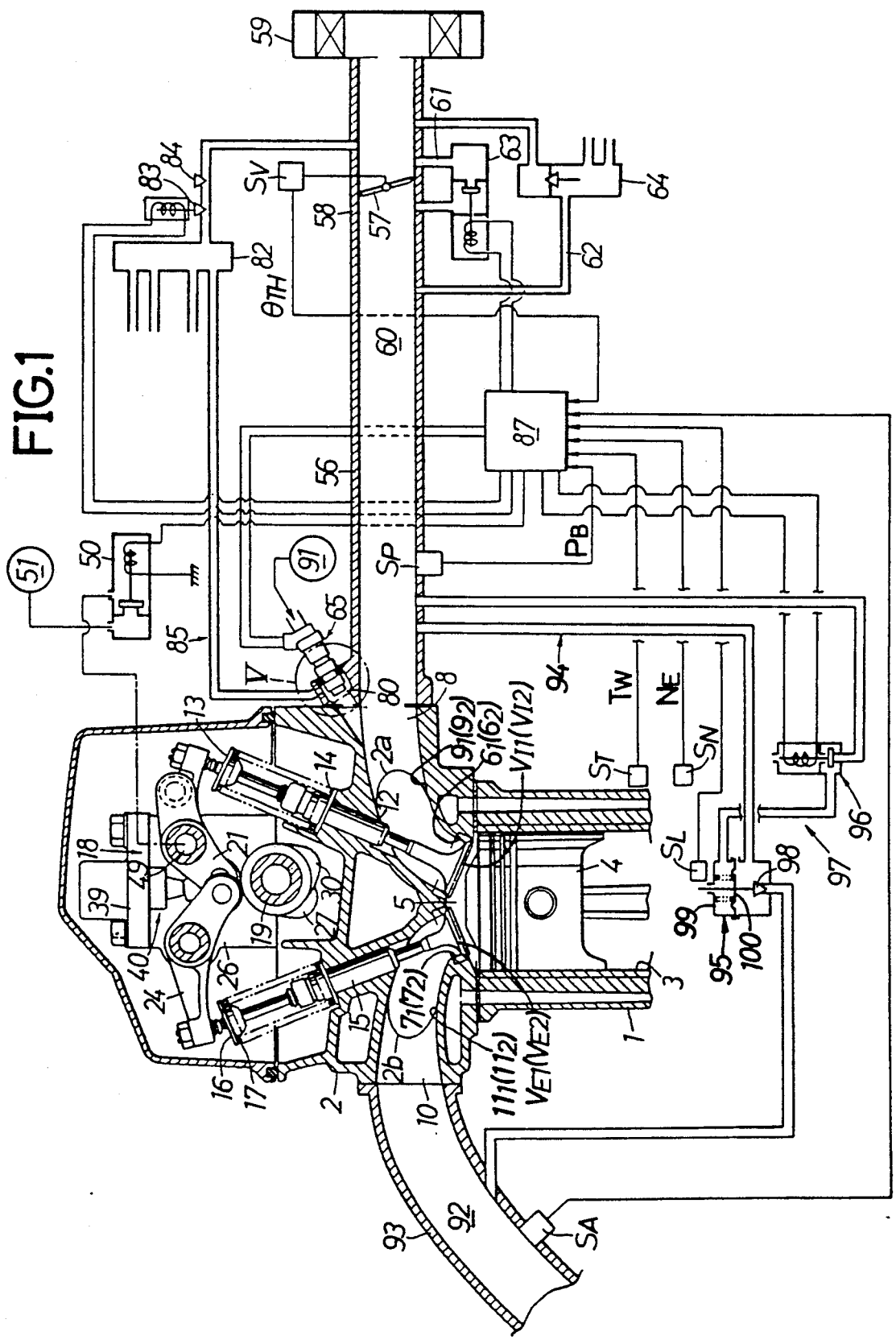
Figure 2:
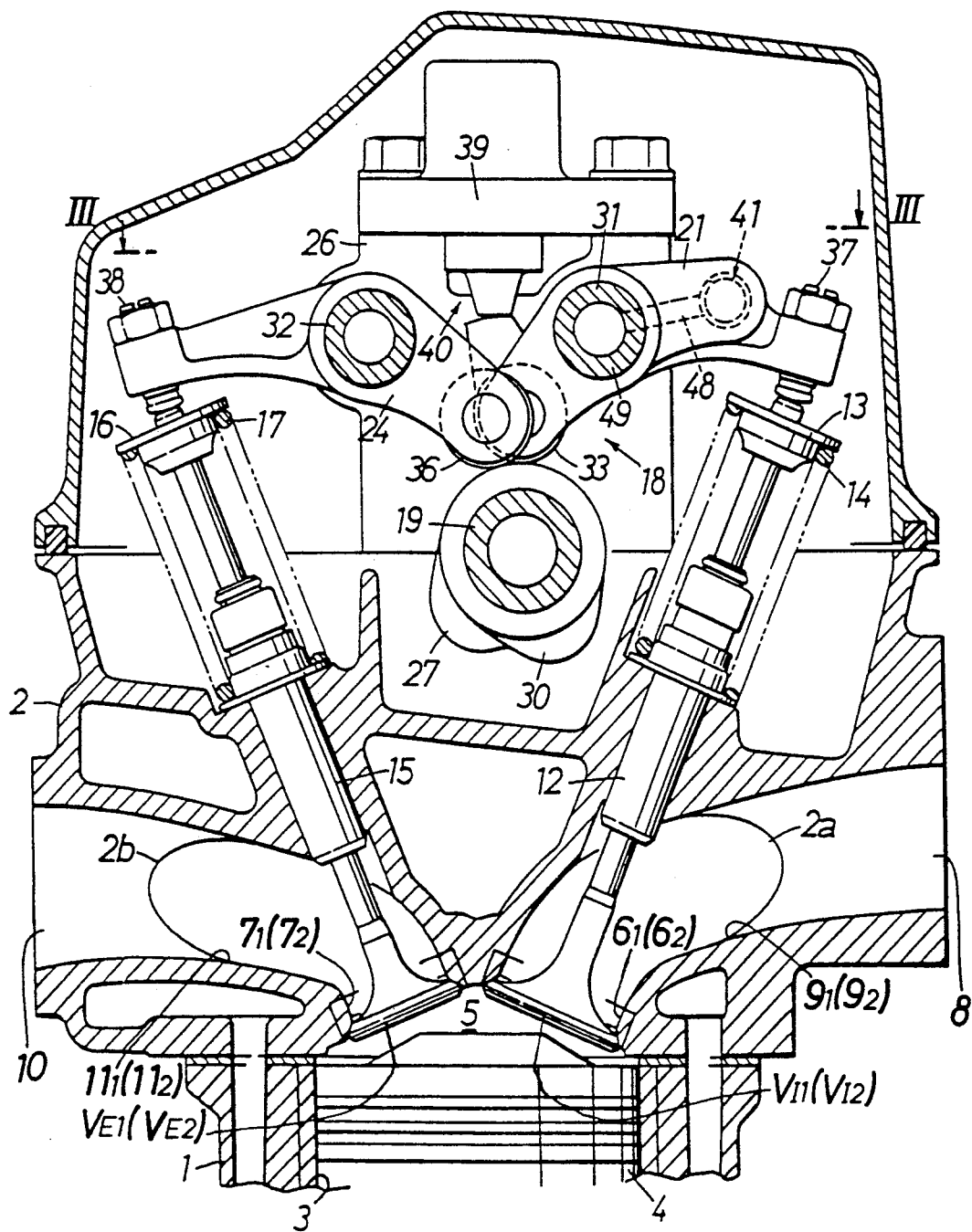

Referring first to FIGS. 1 and 2, a cylinder head 2 is mounted on an upper surface of a cylinder block 1 to form an engine body of an SOHC type multi-cylinder internal combustion engine, and a piston 4 is slidably received in each of a plurality of cylinders 3 provided in the cylinder block 1 A combustion chamber 5 is defined between an upper surface of the piston 4 and the cylinder head 2.

A pair of intake valve bores $6_1$ and $6_2$ and a pair of exhaust valve bores $7_1$ and $7_2$ are provided in the cylinder head 2 and open into a ceiling surface of the combustion chamber 5. The intake valve bores $6_1$ and $6_2$ are connected to a single intake passage 8 in one side of the cylinder head 2 through intake ports $9_1$ and $9_2$ provided on opposite sides of a partition wall $2a$. The exhaust valve bores $7_1$ and $7_2$ are connected to a single outlet, passage 10 in the other side of the cylinder head 2 through exhaust ports $11_1$ and $11_2$ provided on opposite sides of a partition wall 2b. A pair of intake valves $V_{I1}$ and $V_{I2}$ capable of independently opening and closing the intake valve bores $6_1$ and $6_2$ are slidably received in a pair of cylindrical guides 12 disposed in the cylinder head 2. A coil valve spring 14 is interposed between the cylinder head 2 and a retainer 13 fixed to an upper end of each of the intake valves $V_{I1}$ and $V_{I2}$ which projects from the corresponding cylindrical guide 12 to surround the corresponding intake valves $V_{I1}$, $V_{I2}$, so that the corresponding intake valve $V_{I1}$, $V_{I2}$ is biased upwardly, i.e., in a closing direction thereof, by the valve spring 14. Additionally, a pair of exhaust valves $V_{E1}$ and $V_{E2}$ capable of independently opening and closing the exhaust valve bores $7_1$ and $7_2$ are slidably received in a pair of cylindrical guides 15 disposed in the cylinder head 2. A coil valve spring 17 is interposed between the cylinder head 2 and a retainer 16 fixed to an upper end of each of the exhaust valves $V_{E1}$ and $V_{E2}$ which projects from the corresponding cylindrical guide 15 to surround the corresponding exhaust valves $V_{E1}$, $V_{E2}$, so that the corresponding exhaust valve $V_{E1}$, $V_{E2}$ is biased upwardly, i.e., in a closing direction thereof, by the valve spring 17.

Figure 3:
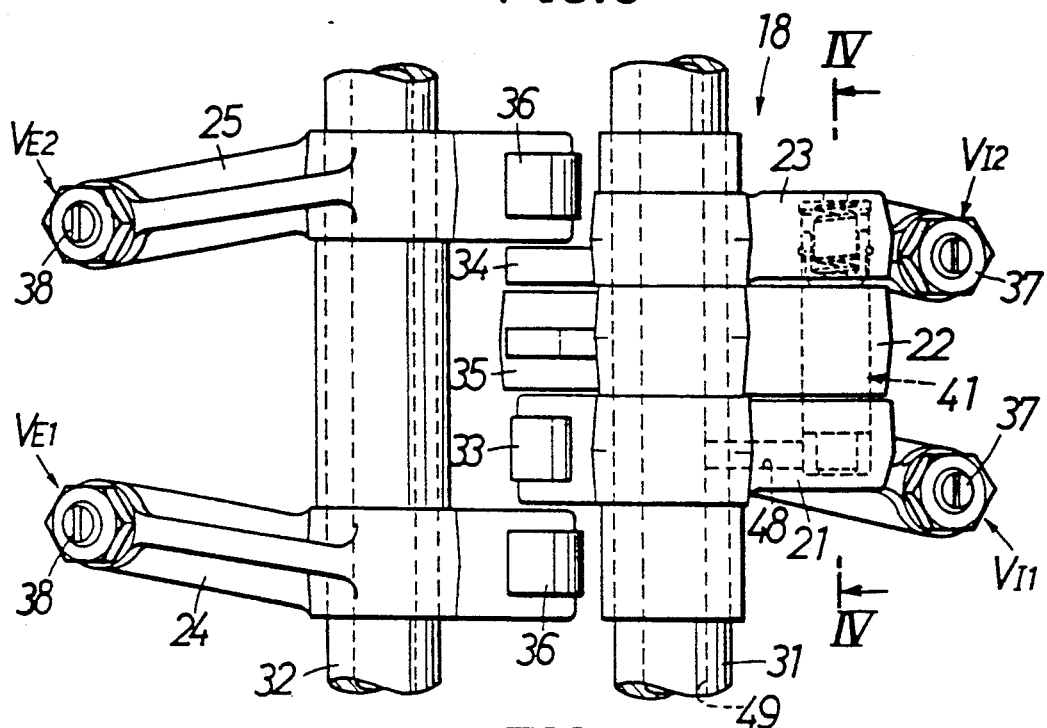
Figure 4:
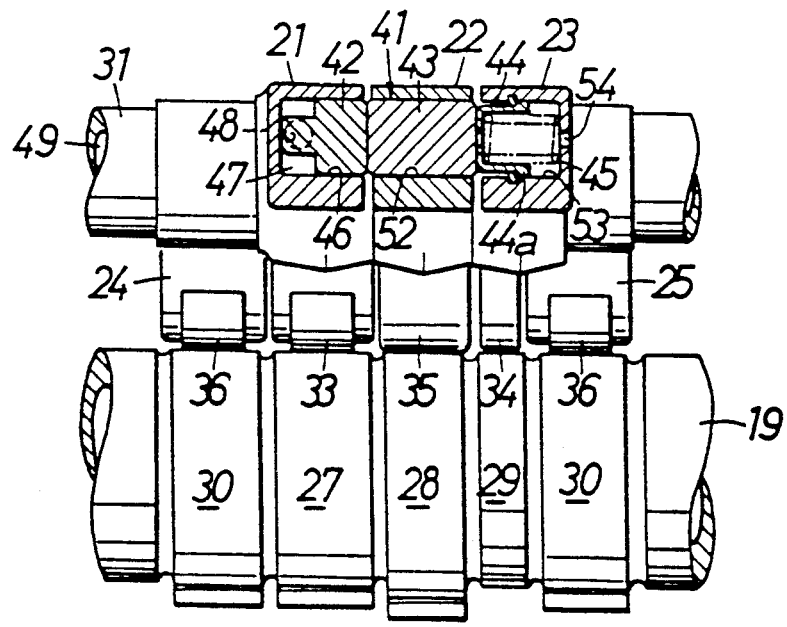

Referring also to FIGS. 3 and 4, a valve-operating device 18 is connected to the intake valves $V_{I1}$ and $V_{I2}$ and the exhaust valves $V_{E1}$ and $V_{E2}$ and also functions as a swirl control device. The valve-operating device 18 comprises a single cam shaft 19 operatively connected to a crankshaft (not shown) with a reduction ratio of ½, first, second and third intake rocker arms 21, 22 and 23 for converting the rotating motion of the cam shaft 19 into the opening and closing motions of the intake valves $V_{I1}$ and $V_{I2}$, and first and second exhaust rocker arms 24 and 25 for converting the rotating motion of the cam shaft 19 into the opening and closing motions of the exhaust valves $V_{E1}$ and $V_{E2}$.

The cam shaft 19 is rotatably supported by the cylinder head 2 and a plurality of holders 26 mounted on the cylinder head 2 on opposite sides of each cylinder 3 along an axis parallel to the crankshaft and perpendicular to the axis of the cylinder 3.

Referring specifically to FIG. 4, integrally provided on the cam shaft 19 are a first intake cam 27 having a shape corresponding to a low load operation of the engine, a second intake cam 28 adjacently disposed on one side of the first intake cam 27 and formed into a shape corresponding to a high load operation of the engine, a cam in the form of an annular raised portion 29 adjacent to one side of the second intake cam 28, and exhaust cams 30 and 30 provided on opposite sides of the first intake cam 27 and the raised portion 29. The cam or raised portion 29 is basically formed to have an outer surface which is circular about the axis of the cam shaft 19 in order to ensure that the one intake valves $V_{I2}$ is in a substantially inoperative state in a low-load operation region of the engine, but a slightly protruding projection is provided in a section corresponding to the rising portion or cam lobe of each of the first and second intake cams 27 and 28. Moreover, the width of the raised portion 29 in a direction along the axis of the cam shaft 19 is relatively small.

The first intake rocker arm 21 is operatively connected to one intake valve $V_{I1}$, while the third intake rocker arm 23 is operatively connected to the other intake valve $V_{I2}$. The second intake rocker arm 22 is disposed between the first and third intake rocker arms 21 and 23, so that it may pivot freely relative to the intake valves $V_{I1}$ and $V_{I2}$. The intake rocker arms 21 to 23 are pivotally mounted on an intake rocker shaft 31 which is fixedly supported in the holders 26 above and laterally of the cam shaft 19 with an axis parallel to the cam shaft 19. The first and second exhaust rocker arms 24 and 25 are operatively connected individually to the exhaust valves $V_{E1}$ and $V_{E2}$ and pivotally mounted on an exhaust rocker shaft 32 which is fixedly supported in the holders 26 above and laterally of the cam shaft 19 and parallel to the intake rocker shaft 31.

A roller 33 is rotatably supported at one end of the first intake rocker arm 21 to be in sliding and rolling contact with the first intake cam 27. A sliding-contact portion 34 having a reduced width is provided at one end of the third intake rocker arm 23 in correspondence to the raised portion 29 to be in sliding contact with the raised portion 29. A cam slipper 35 is provided on the second intake rocker arm 22 to be in sliding contact with the second intake cam 28. Also, rollers 36 are rotatably supported at one end of each of the exhaust rocker arms 24 and 25 to come into sliding and rolling contact with the exhaust cams 30 and 30 provided on the cam shaft 19, respectively.

Tappet screws 37 are threadably mounted at the other ends of the first and second intake rocker arms 21 and 23 to abut against the upper ends of the intake valves $V_{I1}$ and $V_{I2}$, respectively, for adjusting the lash or space between the screws and the valves and the intake valves $V_{I1}$ and $V_{I2}$ are opened and closed in accordance with the pivoting movements of the first and third intake rocker arms 21 and 23. Tappet screws 38 are also threadedly mounted at the other ends of the exhaust rocker arms 24 and 25 to abut against the upper ends of the exhaust valves $V_{E1}$ and $V_{E2}$, respectively, for lash adjusting and the exhaust valves $V_{E1}$ and $V_{E2}$ are opened and closed in accordance with the pivoting movements of the exhaust rocker arms 24 and 25.

A support plate 39 is mounted to extend between the ends of each of the holders 26, and a lost motion mechanism 40 is disposed on the support plate 39 for resiliently biasing the second intake rocker arm 22 into sliding contact with the second intake cam 28 on the cam shaft 19.

A valve connection switchover mechanism 41 is provided on the intake rocker arms 21 to 23 for switching-over the connection and disconnection of the intake rocker arms 21 to 23 in accordance with the operational condition of the engine. The connection switchover mechanism 41 comprises a connecting piston 42 capable of interconnecting the first and second intake rocker arms 21 and 22, a connecting pin 43 capable of interconnecting the second and third intake rocker arms 22 and 23, a restraining member 44 for restraining the movements of the connecting piston 42 and the connecting pin 43, and a return spring 45 for biasing the connection piston 42, the connecting pin 43 and the restraining member 44 toward their rocker arm disconnected positions (leftwardly when viewed in FIG. 4).

A first bottomed guide hole 46, open toward the second intake rocker arm 22, is provided in the first intake rocker arm 21 in parallel to the intake rocker shaft 31. The connecting piston 42 is slidably received in the first guide hole 46 to define a hydraulic pressure chamber 47 between one end of the connecting piston 42 and the closed end of the first guide hole 46. A communication passage 48 is provided in the first intake rocker arm 21 to communicate with the hydraulic pressure chamber 47. An oil passage 49 is provided in the intake rocker shaft 31 to continually communicate with the communication passage 48 and thus with the hydraulic pressure chamber 47 despite the pivoting movement of the first intake rocker arm 21. The oil passage 49 is connected to a source of hydraulic pressure 51 through a connection switchover electromagnetic control valve SO, as shown in FIG. 1.

A guide bore 52 adjacent the first guide hole 46 is provided in the second intake rocker arm 22 to extend between opposite sides of the second intake rocker arm 22 parallel to the intake rocker shaft 31 and the connecting pin 43, with its one end abutting against the other end of the connecting pin 42, is slidably received in the guide bore 52.

A second guide hole 53 adjacent the guide bore 52 is provided in the third intake rocker arm 23 parallel to the intake rocker shaft 31 and open toward the intake rocker arm 22. The cup-shaped cylindrical restraining member 44, abutting against the other end of the connecting pin 43, is slidably received in the second guide hole 53. The restraining member 44 is disposed with its open end turned toward a closed end of the second guide hole 53 and a collar 44a projecting radially outwardly at that open end is in sliding contact with an inner surface of the second guide hole 53. The return spring 45 is mounted in a compressed manner between the closed ends of the second guide hole 53 and the restraining member 44 so that the connecting piston 42, the connecting pin 43 and the restraining member 44, which are in abutment against one another, are biased toward the hydraulic pressure chamber 47 by the spring force of the return spring 45. Moreover, an air and oil venting communication hole 54 is provided in the closed end of the second guide hole 53.

In such connection switchover mechanism 41, when the engine is in a low-load operation, the hydraulic pressure in the hydraulic pressure chamber 47 is released through the connection switchover electromagnetic control valve 50, and the abutting surfaces of the connecting piston 42 and the connecting pin 43 are in a position between the first and second intake rocker arm 21 and 22, while the abutting surfaces of the connecting pin 43 and the restraining member 44 are in a position between the second and third intake rocker arms 22 and 23. Therefore, the intake rocker arms 21 to 23 are in states in which they are angularly displaceable relative to one another. Thus, the first intake rocker arm 21 is pivoted in response to the sliding contact with the first intake cam 27 by rotation of the cam shaft 19, thereby causing the one intake valve $V_{I1}$ to be opened and closed with a timing and a lift amount depending upon the shape of the first intake cam 27. The third intake rocker arm 23 is in sliding contact with the raised portion 29 is in a substantially inoperative state, so that the other intake valve $V_{I2}$ is in a substantially inoperative state. However, the intake valve $V_{I2}$ is not completely inoperative and will be operated slightly in an opening direction, when the one intake valve $V_{I1}$ is opened. This ensures that the intake valve $V_{I2}$ is prevented from sticking to the valve seat and prevents fuel from collecting at the valve. Further, the second intake rocker arm 22 is pivoted in response to the sliding contact with the second intake cam 28, but such motion exerts no influence on the first and third intake rocker arms 21 and 23. The exhaust valves $V_{E1}$ and $V_{E2}$ are also opened and closed with a timing and a lift amount depending upon the shape of the exhaust cams 30.

When the engine is in a high-load operation, the connection switchover electromagnetic control valve 50 is opened, so that a high hydraulic pressure is applied to the hydraulic pressure chamber 47. This causes the connecting piston 42 to be moved in a direction to increase the volume of the hydraulic pressure chamber 47 against the spring force of the return spring 45, while urging the connecting pin 43 to move. When the axes of the first guide hole 46, the guide bore 52 and the second guide hole 53 are aligned with one another, i.e., when the intake rocker arms 21, 22 and 23 are in their stationary states, the connecting piston 42 is forced into the guide bore 52. In response to this, the connecting pin 43 is forced into the second guide hole 53, thereby providing the connection of the intake rocker arms 21, 22 and 23, and the first and third intake rocker arms 21 and 23 are pivoted together with the second intake rocker arm 22 which is in sliding contact with the second intake cam 28. This causes the intake valves $V_{I1}$ and $V_{I2}$ to be opened and closed with a timing and a lift amount depending upon the shape of the second intake cam 28. In addition, the exhaust rocker arms 24 and 25 causes the exhaust valves $V_{E1}$ and $V_{E2}$ to be opened and closed with a timing and a lift amount depending upon the shape of the exhaust cams 30 as in the low load operation.

Referring again to FIG. 1, an air cleaner 59 is connected to the intake passage 8 through an intake manifold 56 and a throttle body 58 having a throttle valve 57. An intake passage 60 is provided in the intake manifold 56 and the throttle body 58 to extend from the air cleaner 59 to the intake passage 8. A bypass passage 61 and a first idle passage 62 are connected in parallel to the intake passage 60 around the throttle valve 57. A bypass electromagnetic control valve 63 is provided in the bypass passage 61, and a wax-operated valve 64 is provided in the first idle passage 62 and is adapted to be operated in accordance with the temperature of the engine body cooling water.

Figure 5:
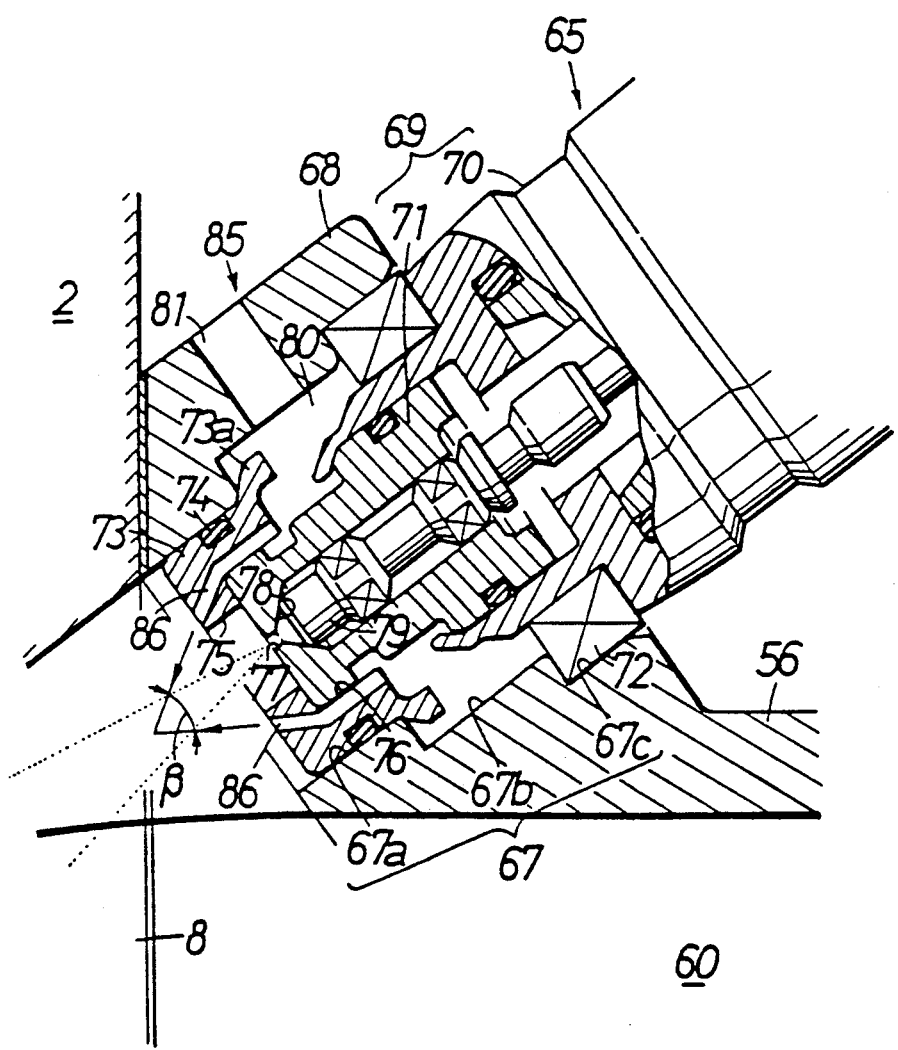

Referring to FIG. 5, a fuel injection valve 65 is mounted at an end of the intake manifold 56 adjacent to face into the cylinder head 2 to face into the intake valve bores $6_1$ and $6_2$ from the intake passage 8. More specifically, a mounting portion 68 is provided at an end of the intake manifold 56 adjacent to the cylinder head 2 and includes a mounting hole 67 having an axis obliquely extending downwardly toward the intake passage 8. The fuel injection valve 65 is mounted in the mounting portion 68 with its tip end projecting into the mounting hole 67.

The mounting hole 67 is comprised of a small diameter hole portion 67a, a medium diameter hole portion 67b and a large diameter hole portion 67c, which are connected to one another in sequence from the inner side of the mounting hole 67. A housing 69 for the fuel injection valve 65 is comprised of a basically cylindrical valve housing 71 secured at its rear end to a drive housing 70 which contains an electromagnetic drive (not shown). The housing 69 is mounted to the mounting portion 68 with a sealing member 72 interposed between the drive housing 70 and a step between the medium diameter hole portion 67b and the large diameter hole portion 67c of the mounting hole 67, so that the valve housing 70 projects into the mounting hole 67.

A receiving member 73 is fitted in the small diameter hole portion 67a of the mounting hole 67 and basically is shaped into a disk-like configuration to have at its rear end an engagement collar 73a which engages a step between the small diameter hole portion 67a and the medium diameter hole portion 67b. A front through-hole 75 and a fitting hole 76 having a larger diameter than that of the through-hole 75 are provided in a central portion of the receiving member 73, so that they are coaxially connected to each other. The tip end of the valve housing 71 of the fuel injection valve 65 is fitted in the fitting hole 76, so that it is received on a step between the through-hole 75 and the fitting hole 76.

A fuel ejection port 77 and a tapered valve seat 78 connected to the fuel ejection port 77 are coaxially provided in a central portion of the tip end of the valve housing 71, and a valve member 79 capable of seating on the valve seat 78 is axially movably supported in the valve housing 71. The valve member 79 is adapted to be driven axially by the electromagnetic drive contained in the drive housing 70 between a position in which it seats on the valve seat 78 to close the fuel ejection port 77 and a position in which it is spaced from the valve seat 78 to open the fuel ejection port 77. When the valve member 79 is moved away from the valve seat 78, fuel from a fuel supply source 91 (see FIG. 1) is ejected from the fuel ejection port 77 forwardly, i.e., toward the intake passage end 8.

With the fuel injection valve 65 mounted on the mounting portion 68, an annular chamber 80 is defined between an inner surface of the mounting portion 68 and the housing 69, and a passage 81 is provided in the mounting portion 68 to lead to the air chamber 80. A pair of air assist ejection ports 86 and 86 are provided in the receiving member 73 on opposite sides of the fuel ejection port 77 in the fuel injection valve 65.

Referring again to FIG. 1, the passage 81 is connected to an air supply header 82 common to all of the cylinders. The air header 82 is connected to the intake passage 60 at a location upstream of the throttle valve 57. The pair of air assist ejection ports 86, 86, the air chamber 80, the air header 82, an electromagnetic air-amount control valve 83 and an idle adjust screw 84, constitute an assist-air supply means, generally designated 85. The amount of assist air supplied from the assist-air supply means 85 can be varied by operation of the electromagnetic air-amount control valve 83.

An exhaust manifold 93 defining an exhaust passage 92, connected to the conventional catalytic converter and silencer (both not shown), is connected to the exhaust outlet passage 10 in the cylinder head 2. An exhaust gas recirculation line 94 is provided to connect the middle of the exhaust passage 92 with a portion of the intake passage 60 located downstream of the throttle valve 57. An electromagnetic exhaust gas control valve 95 is provided in the exhaust gas recirculation line 94, and an electromagnetic pilot valve 96 is interposed between the electromagnetic exhaust gas control valve 95 and a portion of the intake passage 60 located downstream of the throttle valve 57 as well as the atmosphere. Thus, an exhaust gas recirculation device, generally designated 97, is constructed by the exhaust gas recirculation line 94, the electromagnetic exhaust gas control valve 95 and the electromagnetic pilot valve 96.

The electromagnetic exhaust gas control valve 95 comprises a valve member 98 for adjusting the flow area of the exhaust gas recirculation line 94. The valve member 98 is connected to a central portion of a diaphragm 100 having the back facing a pressure chamber 99, and the diaphragm 100 is biased by a spring (unnumbered), so that it is deflected in a direction to drive the valve member 98 in a closing direction. Thus, the flow area of the exhaust gas recirculation line 94 and thus the amount of exhaust gas recirculated from the exhaust passage 92 to the intake passage 60 can be varied in accordance with the pressure in the pressure chamber 99.

The electromagnetic pilot valve 96 is adapted to be shifted between a state in which the pressure in the intake passage 60 at a location downstream of the throttle valve is introduced into the pressure chamber 99 and a state in which the pressure chamber 99 is opened to the atmosphere. Therefore, the amount of exhaust gas recirculated can be varied by operation of the electromagnetic pilot valve 96.

The operations of the connection switchover electromagnetic control valve 50, the bypass electromagnetic control valve 63, the fuel injection valve 65, the electromagnetic air-amount control valve 83 in the assist-air supply means 85 and the electromagnetic pilot valve 96 in the exhaust gas recirculation device 97 are controlled by a control means 87 which includes a computer. An intake pressure $P_B$ detected in an intake pressure sensor $S_P$, a cooling water temperature $T_W$ detected in an engine cooling water temperature sensor $S_T$, an engine speed of rotation or revolutions number $N_E$ detected in a revolutions number sensor $S_N$, and values detected in an air-fuel ratio sensor $S_A$ for detecting an air-fuel ratio from the composition of the exhaust gas in the exhaust passage 92, a throttle sensor $S_V$ for detecting the opening degree of the throttle valve 57 and a lift sensor $S_L$ for detecting the opening degree of the electromagnetic exhaust gas control valve 95 and thus the lift amount of the valve member 98 are supplied to the control means 87.

The control means 87 controls the operation of the connection switchover mechanism 41 in the valve-operating device 18 to substantially stop the suction from one of the intake ports $9_2$ in a low load operation of the engine by maintaining the intake valve $V_{I2}$ in its substantially inoperative state to produce a swirl in the combustion chamber 5 by drawing almost all of the air-fuel mixture into the combustion chamber through only the single intake port $9_1$ and intake valve bore $6_1$. The control means 87 also controls the operation of the connection switchover mechanism 41 in the valve-operating device 18 in a high load operation of the engine to provide a non-swirl operation condition in which both the intake valves $V_{I1}$ and $V_{I2}$ are operated to full open positions. In addition, the control means 87 controls the operations of the electromagnetic air-amount control valve 83 and the electromagnetic pilot valve 96 to control the supply of assist air from the assist-air supply means 85 and the amount of exhaust gas recirculated by the exhaust gas recirculation device 97 in accordance with the operational condition of the engine.

Figure 6:
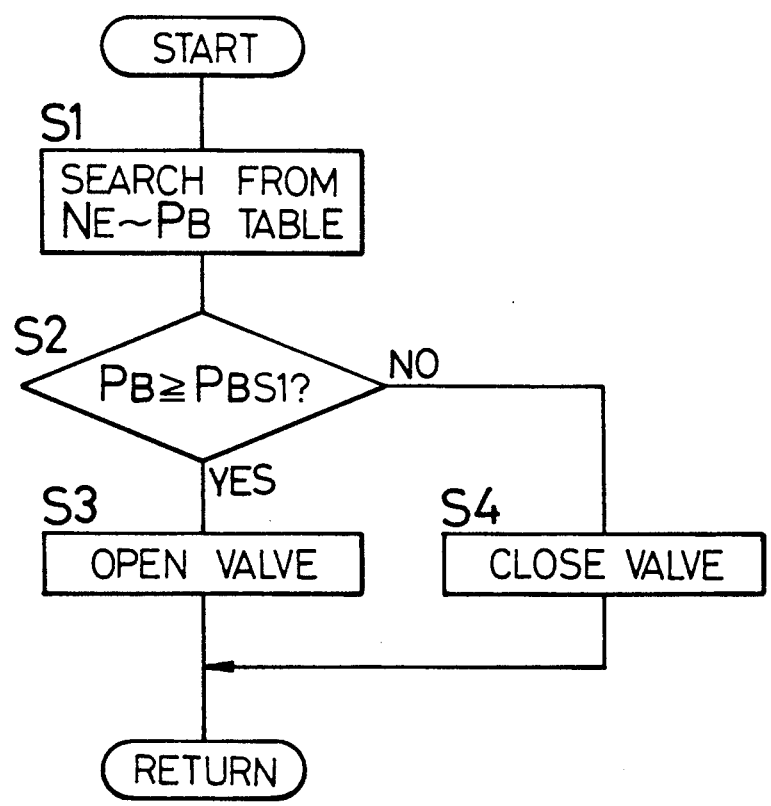
Figure 7:
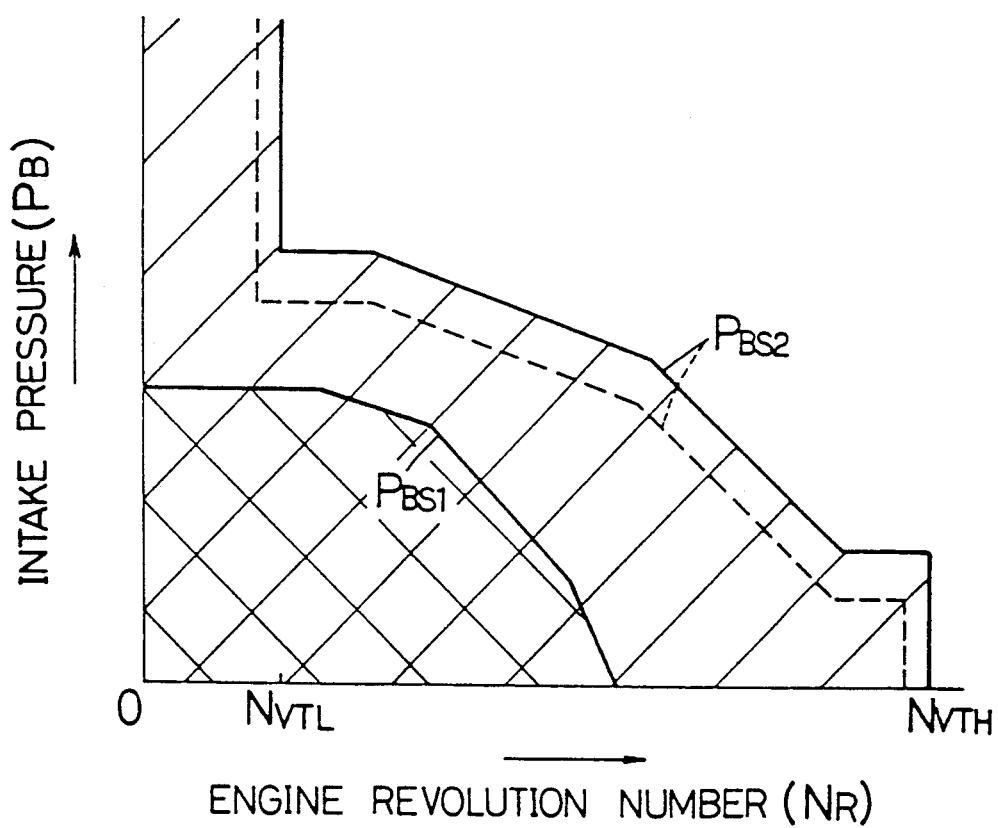

A processing procedure for controlling the operation of the electromagnetic air-amount control valve 83 will now be described with reference to FIG. 6. At a first step S1, a search on the basis of an $N_E - P_B$ table previously established as shown in FIG. 7 is carried out. If it has been decided at a next step S2 that the intake pressure $P_B$ is equal to or more than a first preset intake pressure $P_{BS1}$ ($P_B \geq P_{BS1}$) as a result of the search, the electromagnetic air-amount control valve 83 is opened at a third step S3 to supply the assist air from the assist air supply means 85. If it has been decided at the second step S2 that the intake pressure $P_B$ is less than the first preset intake pressure $P_{BS1}$ ($P_B < P_{BS1}$), the electromagnetic air-amount control valve 83 is closed at a fourth step S4 to stop the supply of the assist air from the assist air supply means 85. In other words, the control means 87 controls the operation of the electromagnetic air-amount control valve 83 to stop the supply assist air from the assist air supply means 85 in the low load operation region in which the intake pressure $P_B$ is less than the first preset intake pressure $P_{BS1}$.

A processing procedure for controlling the operation of the connection switchover mechanism 41 in the valve operating device 18, i.e., the operation of the connection switchover electromagnetic control valve 50 is previously established in the control means 87, as shown in FIG. 8. At a first step M1 in FIG. 8, it is decided whether or not the engine revolution number $N_E$ is equal to or more than a preset high revolution number $N_{VTH}$ ($N_E \geq N_{VTH}$) If it has been decided that $N_E \geq N_{VTH}$, the processing is advanced to a second step M2 at which the connection switchover electromagnetic control valve 50 is opened, and the connection switchover mechanism 41 is operated to provide the connection, so that the intake valves $V_{I1}$ and $V_{I2}$ are opened and closed by the second intake cam 28.

If it has been decided at the first step M1 that $N_E < N_{VTH}$, it is decided at a third step M3 whether or not the engine revolution number $N_E$ is equal to or less than a preset low revolutions number $N_{VTL}$ ($N_E \geq N_{VTL}$). If it has been decided that ($N_E \geq N_{VTL}$), the connection switchover electromagnetic control valve 50 is closed, and the connection switchover mechanism 41 is operated to release the connection, so that the one intake valve $V_{I1}$ is opened and closed by the first intake cam 27, and the other intake valve $V_{I2}$ remains in its substantially inoperative state.

If it has been decided at the third step M3 that $N_E < N_{VTL}$, the processing is advanced to a fifth step M5 at which a search from the $N_E - P_B$ table previously established as shown in FIG. 7 is carried out. A second preset intake pressure $P_{BS2}$ higher than the first preset intake pressure $P_{BS1}$ is established on the table in a range in which the engine revolutions number $N_E$ is equal to or more than the low preset revolutions number $N_{VTL}$ and less than a high preset revolutions number $N_{VTH}$. If it has been decided at a next sixth step M6 that the intake pressure $P_B$ is equal to or more than the second preset intake pressure $P_{BS2}$ ($P_B \geq P_{BS2}$) as a result of such search, the processing is advanced to a seventh step M7. If it has been decided that $P_B < P_{BS2}$, the processing is advanced to an eighth step M8. Moreover, the second preset intake pressure $P_{BS2}$ is set to have a systerisis. When the connection switchover mechanism 41 is shifted from the disconnecting state to the connecting state, a value indicated by the solid line in FIG. 7 is used. When the connection switchover mechanism 41 is shifted from the connecting state to the disconnecting state, a value indicated by the dashed line in FIG. 7 is used.

The count-down of a preset time, e.g., 3 seconds previously set in a timer $T_{VOFF}$ is started at the seventh step MT and thereafter, the processing is advanced to the second step M2. At the eighth step M8, it is decided whether or not the timer $T_{VOFF}$ set at the seventh step M7 has reached "O", i.e., whether or not 3 seconds have elapsed after establishment of $P_B \geq P_{BS2}$ in the range in which the engine revolutions number $N_E$ is equal to or more than the low preset revolutions number $N_{VTL}$ and less than a high preset revolutions number $N_{VTH}$. Only when it has been decided that the predetermined time has elapsed, the processing is advanced to the fourth step M4.

The summary of such processing procedure shown in FIG. 8 is as follows. In an operational region in which the intake pressure $P_B$ is equal to or more than the second preset intake pressure $P_{BS2}$ in accordance to the engine revolutions number $N_E$, the connection switchover mechanism 41 is in its connected state, so that the intake valves $V_{I1}$ and $V_{I2}$ are opened and closed by the second intake cam 28 to provide the non-swirl operational condition. In other operational regions, the connection switchover mechanism 41 is in its disconnected state, and the one intake valve $V_{I1}$ is opened and closed by the first intake cam 27, while the other intake valve $V_{I2}$ is in its substantially inoperative state to provide the swirl operational condition. Moreover, when the connection switchover mechanism 41 is shifted from the connected state to the disconnected state in a range of the engine revolutions number $N_E$ equal to or more than the low preset revolution number $N_{VTL}$ and less than the high preset revolution number $N_{VTH}$, the operation of the connection switchover mechanism 41 to the disconnected state is prohibited until the predetermined time, e.g., 3 seconds, has elapsed. This avoids a hunting of control that is liable to be produced when the switching operation of the connection switchover mechanism 41 is decided only on the basis of the intake pressure $P_B$, because the intake pressure $P_B$ is liable to be varied (particularly during increasing of speed).

Figure 9B:
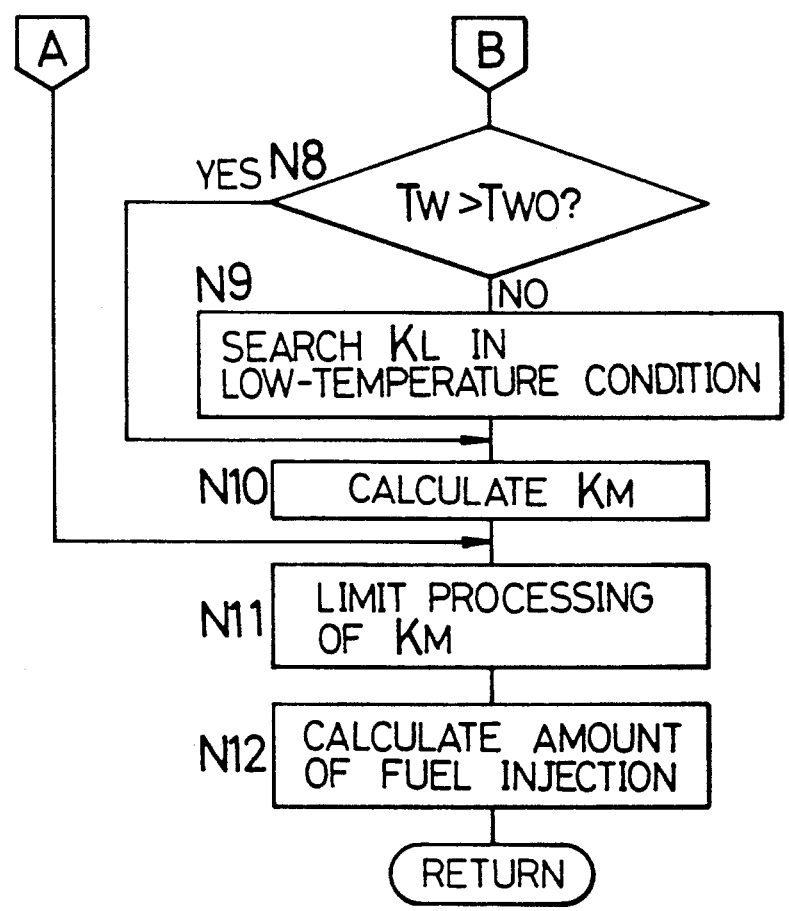

A processing procedure for controlling the air-fuel ratio, i.e., the amount of fuel injected from the fuel injection valve 65, is previously established in the control means 87, as shown in FIG. 9, which is comprised of FIGS. 9A and 9B. At a first step N1 in FIG. 9, it is decided whether or not a fuel-cutting is being conducted by the controls of the engine revolutions number and the vehicle speed, the traction control and the like. If it has been decided that the fuel-cutting is being conducted, a given air-fuel ratio correspondence value $K_C$ is set at a second step N2 and thereafter, the processing is advanced to an eleventh step N11.

Herein, the term "air-fuel ratio correspondence value $K_C$" and the term "air-fuel ratio correspondence values $K_M$, $K_a$, $K_B$ and $K_L$", which will be described hereinafter, are defined such that they are of 1.0 when the air-fuel ratio (the ratio of air to fuel A/F by weight) is of a theoretical value, and they are of 0 (zero) when the air-fuel ratio is of the maximum value, i.e., when a lean fuel combustion condition is provided.

If it has been decided at the first step N1 that the fuel-cutting is not being conducted, the processing is advanced to a third step N3 at which it is decided whether or not a predetermined time $T_1$ has elapsed after completion of the fuel-cutting. If the time $T_1$ has not elapsed, the processing is advanced to the second step N2. Thus, the given air-fuel ratio correspondence value $K_C$ is set at the second step N2, because it is meaningless during fuel-cutting as well as until the time $T_1$ has elapsed after completion of the fuel-cutting that the air-fuel ratio is controlled on the basis of a value detected in the air-fuel ratio sensor $S_A$.

If it has been decided at the third step N3 that the time $T_1$ has elapsed, in a fourth step N4 it is decided whether or not a difference between an air-fuel ratio correspondence value $K_{M(n-1)}$ set at the last time and a last actual air-fuel ratio correspondence value $K_{a(n-1)}$ is larger than a predetermined value $\Delta K_O$. It should be noted that the actual air-fuel ratio correspondence value $K_a$ is determined on the basis of an air-fuel ratio detected by the air-fuel ratio sensor $S_4$. If it has been decided that such difference is large than the predetermined value $\Delta K_O$, the processing is advanced to the second step N2 at which the given air-fuel ratio correspondence value $K_C$ is set. If it has been decided that the difference is not larger than the predetermined value $\Delta K_O$, the processing is advanced to a fifth step N5.

At the fifth step N5, it is decided whether or not the engine is in its non-swirl operation, i.e., whether or not the connection switchover mechanism 41 is in its connected state. If it has been decided that the engine is in its non-swirl operation, an air-fuel ratio correspondence value $K_B$ is searched from a previously established map at a sixth step N6. If it has been decided that the engine is in its swirl operation, i.e., the connection switchover mechanism 41 is in its disconnected state, an air-fuel ratio correspondence value $K_B$ is searched from a previously established map at a seventh step N7. It is to be noted that the map used to determine the air-fuel ratio in the non-swirl operation of the engine is established in substantial correspondence to a theoretical air-fuel ratio. In addition, the map used to determine the air-fuel ratio in the swirl operation of the engine is established to determine an air-fuel ratio (A/F) in a large range in correspondence to a lean burn, but so that the air-fuel ratio is gradually reduced, i.e., the air-fuel ratio correspondence value $K_B$ is gradually increased, in an area corresponding to a transition from a low load to a high load, in order to avoid a rapid variation in air-fuel ratio when the swirl operation and the non-swirl operation are changed from each other.

At an eighth step N8, it is decided whether or not the temperature $T_W$ of the engine cooling water is higher than a preset water temperature $T_{WO}$. If it has been decided that the temperature $T_W$ is higher than the preset water temperature $T_{WO}$, the processing is advanced to a tenth step N10, bypassing a ninth step N9. On the other hand, if it has been decided that the temperature $T_W$ is in a low temperature state in which the temperature $T_W$ is equal to or less than the preset water temperature $T_{WO}$, an air-fuel ratio correspondence value $K_L$ is searched from a map previously set for use at a low temperature.

At the tenth step N10, a target air-fuel ratio correspondence value $K_M$ is calculated by multiplying an air-fuel ratio correspondence value $K_B$ set except for the low temperature state by a correcting factor in full opening of the throttle valve, a correcting factor depending upon the vehicle speed and the like. Further, at the next eleventh step N11, it is decided whether or not the target air-fuel ratio correspondence value $K_M$ in a given range, and if the target air-fuel ratio correspondence value $K_M$ exceeds the given range, the maximum or minimum value previously set is produced as the target air-fuel ratio correspondence value $K_M$. At a twelfth step N12, a fuel injection amount is calculated by correcting the target air-fuel ratio correspondence value $K_M$ by a feed-back factor or the like and thus, the amount of fuel injected from the fuel injection valve 65 is determined. According to the control procedure shown in FIG. 9 (FIGS. 9A & 9B), the swirl operation is carried out by a lean burn in a low load of the engine, and the non-swirl operation is carried out by a burn based on the theoretical air-fuel ratio during a high load of the engine.

Figure 10A:
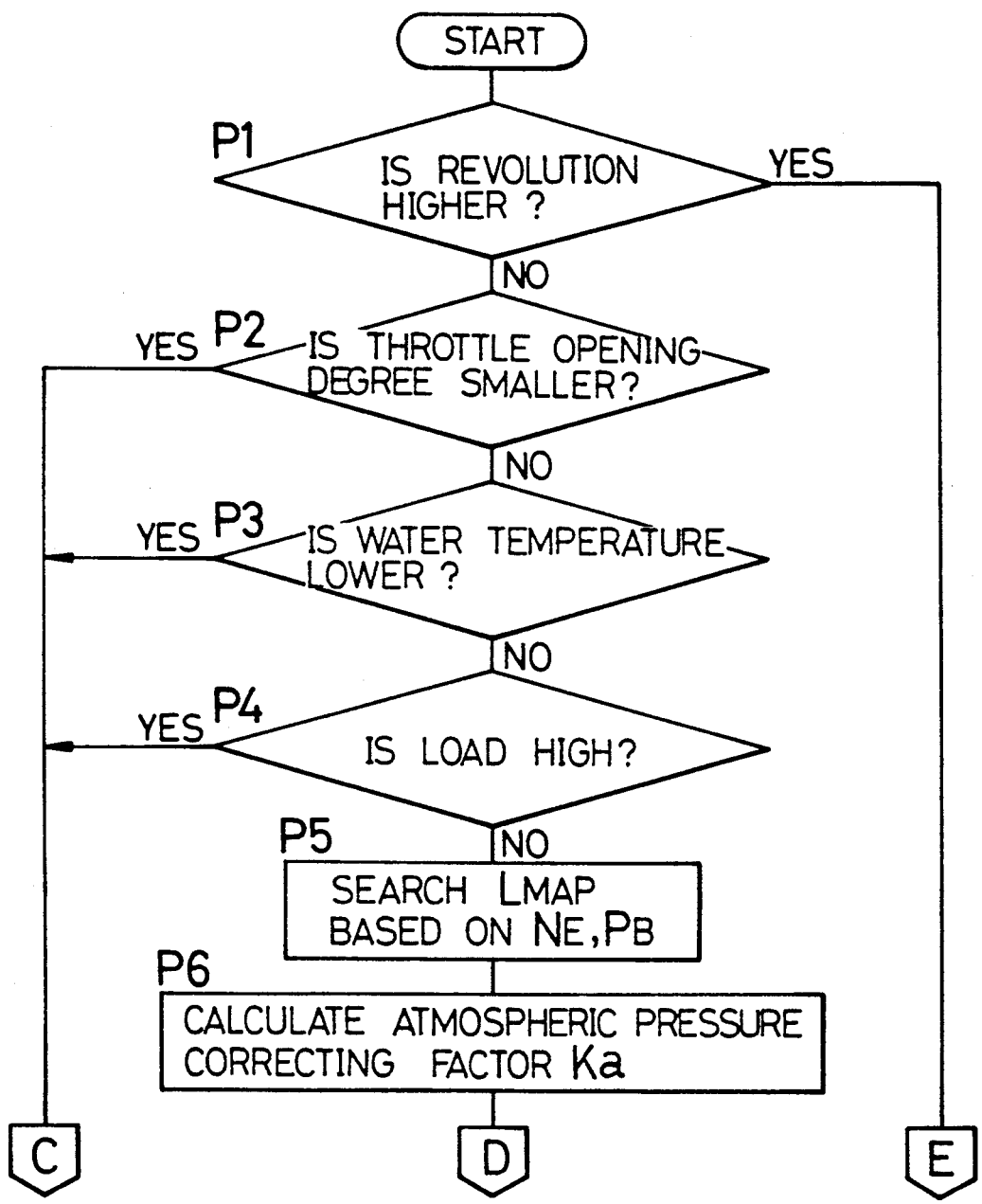
FIGS. 10A and 10B are flow charts illustrating a processing procedure for controlling the amount of exhaust gas recirculated.
Figure 10B:
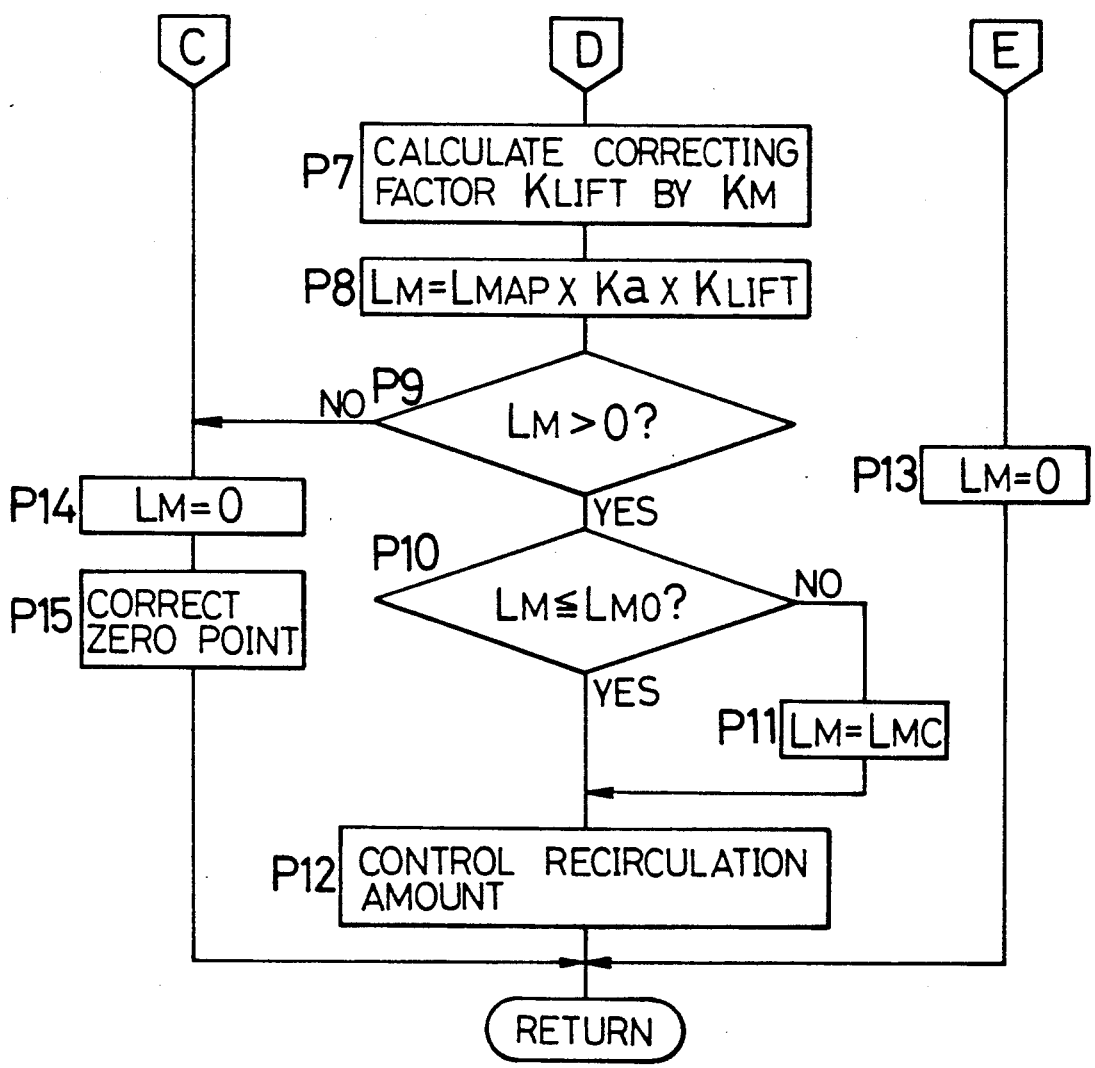

Further, a processing procedure for controlling the amount of exhaust recirculated, i.e., the opening degree of the exhaust gas control valve 95 by the operation of the electromagnetic pilot valve 96 is established in the control means 87, as shown in FIG. 10 (FIGS. 10A and 10B). At first to fourth steps P1 to P4 in FIG. 10 it is decided whether or not the engine revolutions number $N_E$ is higher than a preset value, whether or not the throttle opening degree $\theta_{TH}$ is smaller than a preset value, whether or not the cooling water temperature $T_W$ is lower than a preset value and whether or not the engine load is higher than a preset load, respectively. If the engine revolutions number $N_E$ is not higher, the throttle opening degree $\theta_{TH}$ is not smaller, the cooling water temperature $T_W$ is not lower, and the engine load is not higher, the processing is advanced to a fifth step P5.

If it has been decided at the first step P1 that the engine revolutions number $N_E$ is higher than the preset value, the opening degree control value $L_M$ the exhaust gas control valve 95 is set at 0 (zero), i.e., the amount of exhaust gas recirculated is set at 0 (zero) at a thirteenth step P13. If it has been decided at the second step P2 the throttle opening degree $\theta_{TH}$ is smaller than the preset value, or if it has been decided at the third step P3 that the water temperature $T_W$ is lower than the preset value, or if it has been decided at the fourth step P4 that the engine load is higher than the preset load, the amount of exhaust gas recirculated is set at 0 (zero) at a fourteenth step P14 and then, a correction of the zero point at the exhaust gas control valve 95 is carried out at a fifteenth step P15.

At the fifth step P5, the exhaust gas recirculation rate L MAP is searched from a previously established map on the basis of the engine revolutions number $N_E$ and the intake pressure $P_B$. Such map is established such that the exhaust gas recirculation rate $L_{MAP}$ is increased as the engine load is increased. At a sixth step P6, an atmospheric pressure correcting factor $K_{PAF}$ is calculated. At a seventh step P7, a correcting factor $K_{LIFT}$ is calculated from a map established as shown in FIG. 11 in accordance with the target air-fuel ratio correspondence value $K_M$.

Figure 11:
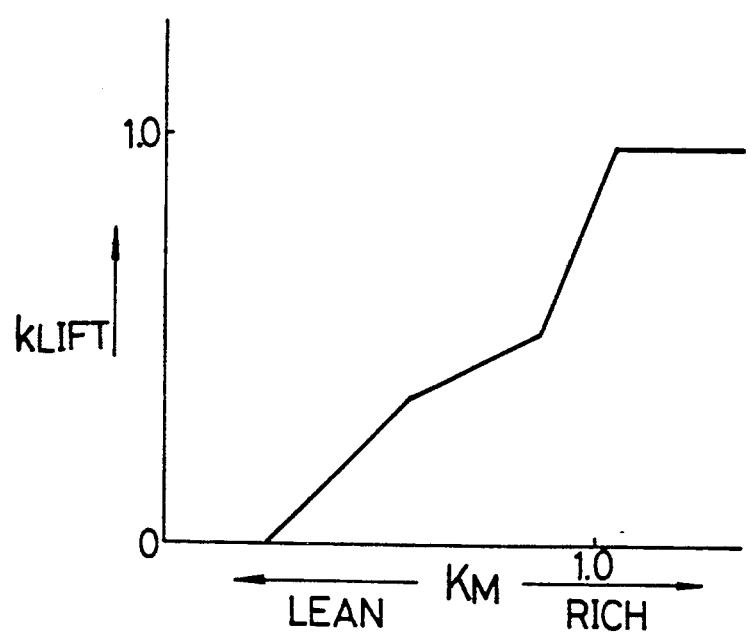

As shown in FIG. 11, the correcting factor $K_{LIFT}$ is defined such that it is of 1.0 when the target air-fuel ratio correspondence value $K_M$ is of 1.0, i.e., of a theoretical air-fuel ratio; the factor $K_{LIFT}$ approaches 0 (zero) from 1.0 as the target air-fuel ratio correspondence value $K_M$ is decreased from 1.0 to 0 (zero), i.e., as the combustion condition is changed to the lean burn condition, and the factor $K_{LIFT}$ is constant at 1.0, when the target air-fuel ratio correspondence value $K_M$ is equal to or larger than 1.0.

At an eighth step P8, the opening degree control value $L_M$ of the exhaust gas control valve 97 is provided by multiplying the exhaust gas recirculation rate $L_{MAP}$ by the correcting factors $K_{PAF}$ and $K_{LIFT}$.

At ninth to eleventh steps P9 to P11, it is decided whether or not the opening degree control value $L_W$ exceeds 0 (zero) and is less than the preset maximum value $L_{MC}$. At a twelfth step P12, the control of the exhaust gas recirculation amount is carried out on the basis of the opening degree control value $L_M$ satisfying the conditions of the steps P9 and P10. When the opening degree control value $L_M$ is equal to or more than the maximum value $L_{MC}$, the control of the exhaust gas recirculation amount is carried out by use of the maximum value Lttc as the opening degree control value.

According to the control procedure shown in FIG. 10 (FIGS. 10A and 10B), the exhaust recirculation device 97 is controlled so that the exhaust gas recirculation amount is smaller during a low load of the engine in which the swirl operation for the lean-fuel combustion is conducted, and the exhaust gas recirculation amount is larger during a high load of the engine in which the non-swirl operation for the burn based on the theoretical air-fuel ratio is conducted.

The operation of this embodiment now will be described. An air flow is ejected from the upper and lower air assist ejection ports 86 and 86 toward a fuel jet ejected from the fuel ejection port 77 in the fuel injection valve 65, and the fuel particles in the fuel jet are finely divided by collision with the air flow. This improves the combustibility in the combustion chamber 5, but in a lower-load side portion (indicated by both rightwardly ascending and descending oblique lines in FIG. 7) of a region (indicated by leftwardly descending oblique lines in FIG. 7) in which the one intake valve $V_{l2}$ is in its substantially inoperative state, and the air-fuel mixture is supplied only from the intake valve bore $6_1$ to produce a swirl in the combustion chamber 5, the air-assisting for the fuel jet from the fuel injection valve 65 is prohibited to avoid the impedance of the generation of the swirl in the combustion chamber 5 by the assist air, thereby preventing deterioration of the combustibility.

Moreover, in substantially stopping the suction from the one intake port $9_2$, by the one intake valve V z being in its substantially inoperative closed state, as compared with a technique in which a shutter valve or the like is disposed in the one intake port $9_2$, the finely-divided fuel will not be deposited on the shutter valve or the closed intake port $9_2$, and an air-assist effect can be utilized more effectively.

When the swirl operation is carried out in this manner during the low load of the engine, the recirculation of a small amount of an exhaust gas is conducted only at the switchover from the low load to the high load, so that the amount of constriction of the throttle valve 57 can be reduced to a relatively small level with the lean-fuel combustion. This ensures that the pumping loss can be reduced to provide reductions in both specific consumption of the fuel and in $NO_X$ by a reduction in combustion temperature.

During the high load of the engine in the non-swirl operation in which the burn is based on the theoretical air-fuel ratio, the recirculation of a large amount of the exhaust gas and the air-assisting are carried out. Therefore, it is possible to provide an improvement in specific consumption of the fuel and a reduction in $NO_X$ by the recirculation of a large amount of the exhaust gas and moreover to avoid the unstabilization of the combustibility otherwise attendant on the recirculation of the exhaust gas.

Figure 12A:
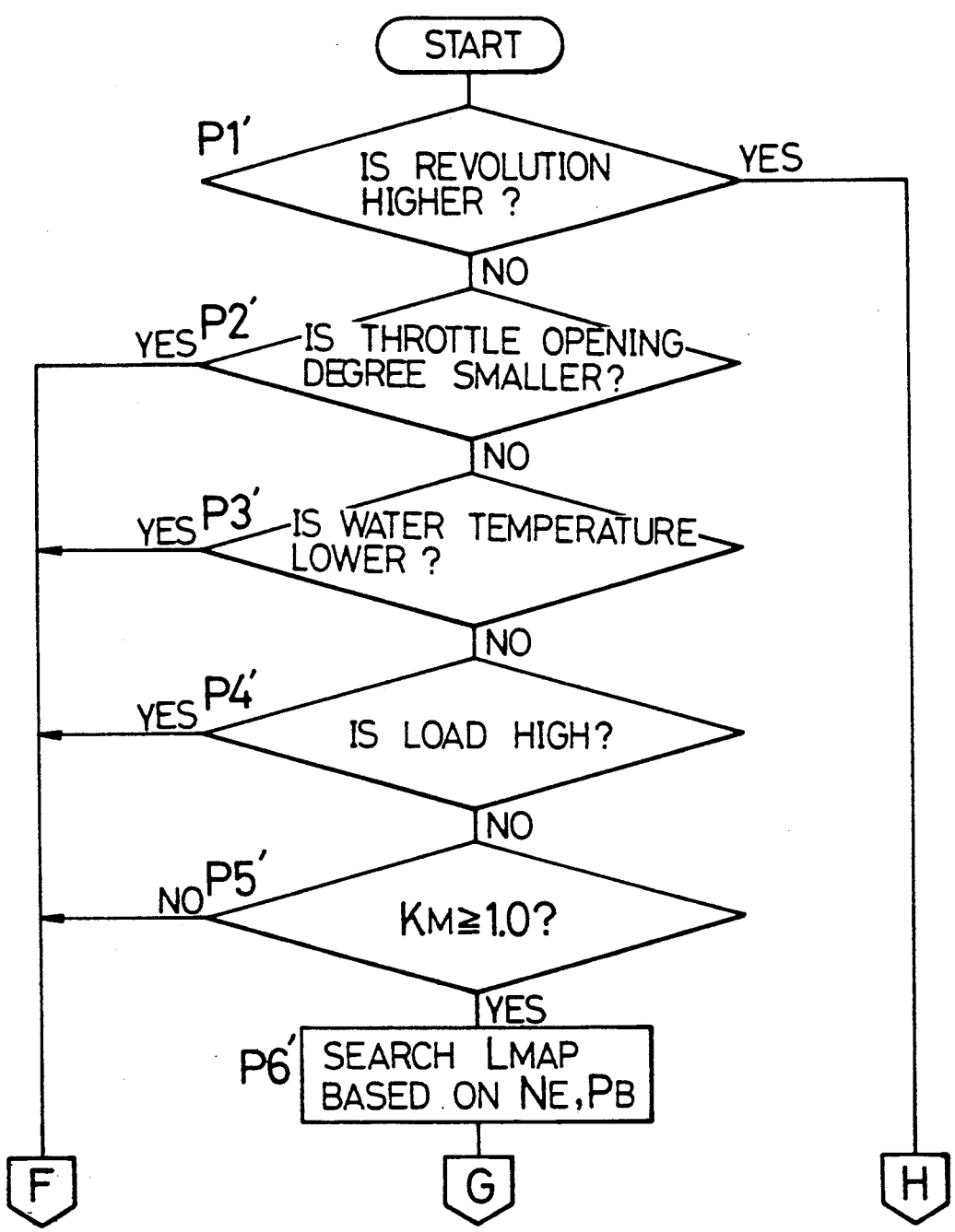
FIGS. 12A and 12B are flow charts similar to FIGS. 10A and 10B but illustrating another embodiment of this invention.
Figure 12B:
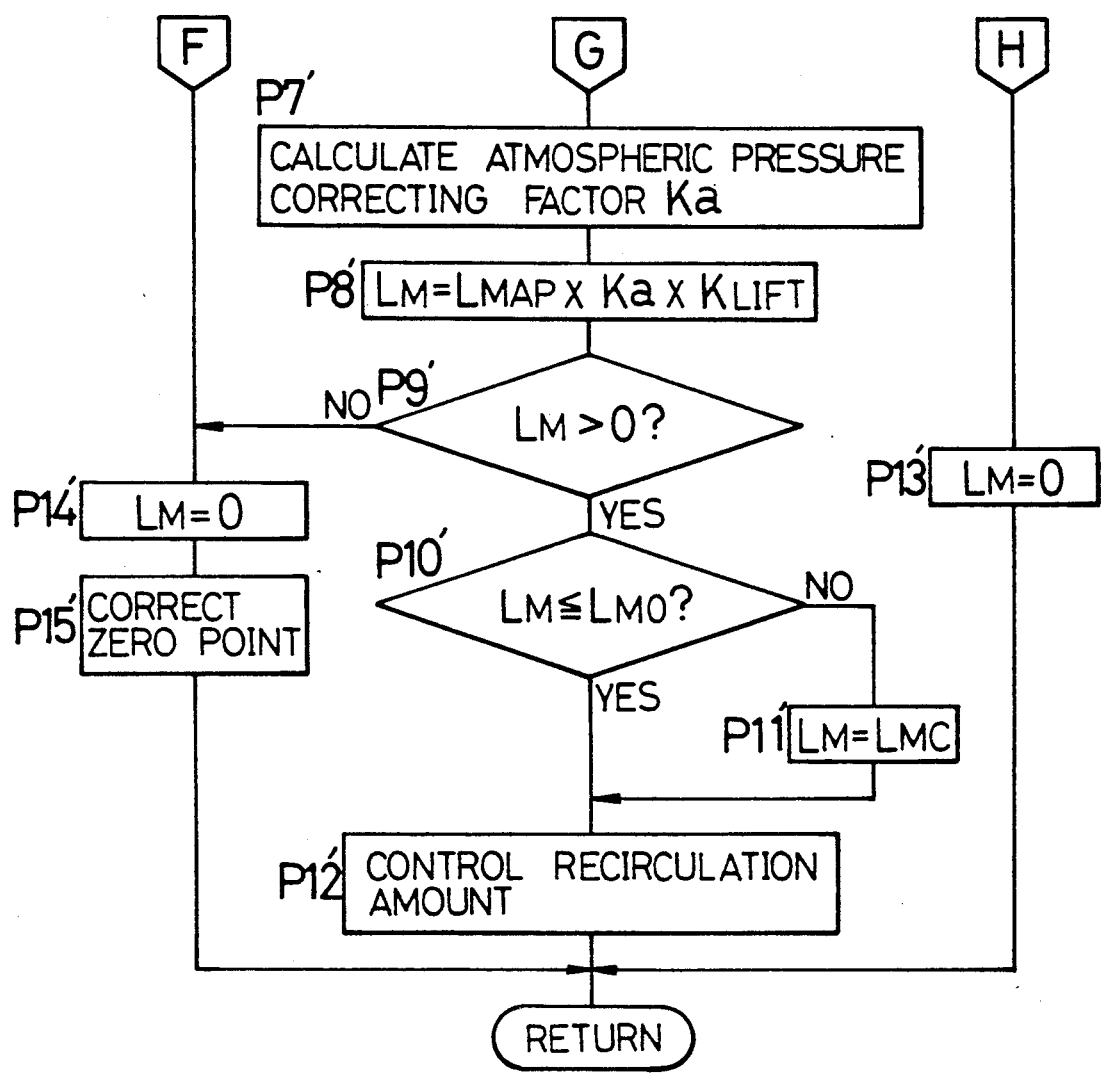

In another embodiment of the present invention, the recirculation of the exhaust gas may be carried out according to a procedure shown in FIG. 12. (comprised of FIGS. 12A and 12B). In the control procedure shown in FIG. 12, steps P1' to P15' are carried out. The difference from the control procedure shown in FIG. 10 is that it is decided at a fifth step P5' whether or not the target air-fuel ratio correspondence value $K_M$ is equal to or more than 1.0 ($K_M > 1.0$), and if the target air-fuel ratio correspondence value $K_M$ is less than 1.0, then the opening degree control value $L_M$ is set at 0 (zero) at a fourteenth step P14'. This eliminates the need for the seventh step P7 shown in FIG. 10.

According this embodiment, in a low load region in which the swirl operation for the lean burn is conducted, the recirculation of the exhaust is prohibited, and only in the high load operation region in which non-swirl operation for the burn based on the theoretical air-fuel ratio is the recirculation of the exhaust gas carried out. This makes it possible to provide an effect similar to that in the above-described first embodiment.

We claim:

1. An internal combustion engine comprising
a fuel injection valve disposed in an intake passage and having an assist air supply means for finely dividing a fuel;
an exhaust gas recirculation device for circulating an exhaust gas from an exhaust passage to the intake passage;
a swirl control device for producing a swirl in a combustion chamber in accordance with the operational condition of the engine; and
a control means for controlling the operations of the assist air supply means, the fuel injection valve, the exhaust gas recirculation device and the swirl control device, wherein
said control means causes a swirl operation for a lean burn during a low load of the engine and a non-swirl operation for a burn based on a theoretical air-fuel ratio during a high load of the engine and the supply of an assist air and the recirculation of a large amount of the exhaust gas are carried out in the non-swirl operation.

2. An internal combustion engine according to claim 1, wherein said control means is arranged to control said exhaust gas recirculation device such that the amount of exhaust gas recirculated is smaller in the swirl operation region of the engine and larger in the non-swirl operation region of the engine.

3. An internal combustion engine according to claim 2, wherein said control beans is arranged to control said exhaust gas recirculation device such that the amount of exhaust gas recirculated is increased as the air-fuel ratio is varied from a lean burn condition to a rich burn condition.

4. An internal combustion engine according to claim 1, 2 or 3, wherein said swirl control device comprises a valve operating device capable of bringing one of two intake valves facing said combustion chamber into its substantially inoperative state.

* * * * *